US011050656B2

United States Patent
Chandra Sekar Rao et al.

(10) Patent No.: US 11,050,656 B2
(45) Date of Patent: Jun. 29, 2021

(54) SYSTEM AND METHOD TO LEARN AND PRESCRIBE NETWORK PATH FOR SDN

(71) Applicant: Dell Products L. P., Round Rock, TX (US)

(72) Inventors: Venkata Chandra Sekar Rao, Bangalore (IN); Abhishek Gupta, Bangalore (IN); Kartikeya Putturaya, Bangalore (IN); Diwahar Sivaraman, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/976,361

(22) Filed: May 10, 2018

(65) Prior Publication Data
US 2019/0349287 A1 Nov. 14, 2019

(51) Int. Cl.
*H04L 12/24* (2006.01)
*H04L 12/751* (2013.01)
*H04L 12/715* (2013.01)
*H04L 12/803* (2013.01)
*G06N 3/04* (2006.01)

(52) U.S. Cl.
CPC ......... *H04L 45/08* (2013.01); *H04L 41/0823* (2013.01); *H04L 41/0896* (2013.01); *H04L 45/64* (2013.01); *H04L 47/125* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 2016/0057061 A1* | 2/2016 | Avci | H04L 43/50 370/235 |
| 2017/0279829 A1* | 9/2017 | Vasseur | H04L 63/1425 |
| 2017/0339022 A1* | 11/2017 | Hegde | G06N 3/0445 |

(Continued)

OTHER PUBLICATIONS

Azzouni, Abdelhadi et al.; "NeuRoute: Predictive Dynamic Routing for Software-Defined Networks"; Sep. 18, 2017; 7 pp.

(Continued)

*Primary Examiner* — Ajit Patel
*Assistant Examiner* — Pamit Kaur
(74) *Attorney, Agent, or Firm* — Krishnendu Gupta; Deepika Bhayana; Dorothy Wu Chiang

(57) ABSTRACT

A path suggestion tool in a Software-Defined Networking (SDN) architecture to predict a router's future usage based on an analysis of the router's historical usage over a given period of time in the past and to recommend a routing path within the network in view of the predicted future usages of the routers/switches in the network. The path suggestion tool is an analytical, plug-and-play model usable as part of an SDN controller to provide more insights into different routing paths based on the future usage of each router. A Long Short-Term Memory Recurrent Neural Network (LSTM-RNN) model in the suggestion tool analyzes the historical usage data of a router to predict its future usage. A Deep Boltzmann Machine (DBM) model in the suggestion tool recommends a routing path within the SDN-based network upon analysis of the LSTM-RNN based predicted future usages of routers/switches in the network.

15 Claims, 5 Drawing Sheets

(56) References Cited

U.S. PATENT DOCUMENTS

| | | | | |
|---|---|---|---|---|
| 2018/0006900 A1* | 1/2018 | Korycki | | H04L 41/064 |
| 2018/0300400 A1* | 10/2018 | Paulus | | G06F 40/58 |
| 2019/0036788 A1* | 1/2019 | Gupta | | H04L 41/147 |
| 2019/0036828 A1* | 1/2019 | Bajaj | | H04L 41/5009 |
| 2019/0182124 A1* | 6/2019 | Jeuk | | G06N 20/00 |

OTHER PUBLICATIONS

Azzouni, Abdelhadi et al.; "NeuTM: A Neural Network-Based Framework for Traffic Matrix Prediction in SDN"; Oct. 17, 2017; 5 pp.
Cabellos, Albert et al.; University of California—Berkeley; Applying ML to SDN: Use-Cases and Ongoing Experiments; Nov. 2015; 33 pp.
Leelavathi, M. V. et al.; "An Architecture of Deep Learning Method to Predict Traffic Flow in Big Data"; vol. 05 Special Issue: 04; ICESMART—2016; May 2016; available @ http://www.esatjournals.org; pp. 462-468. (8 pp.).
Ma, Xiaolei et al.; Sensors Article; "Learning Traffic as Images: A Deep Convolutional Neural Network for Large-Scale Transportation Network Speed Prediction"; Jan. 30, 2017; pp. 1-16.
Ma, Xiaolei et al.; Research Article; "Large-Scale Transportation Network Congestion Evolution Prediction Using Deep Learning Theory"; Mar. 17, 2015; pp. 1-17.
Ma, Xiaolei et al.; Transportation Research Part C; "Long Short-Term Memory Neural Network for Traffic Speed Prediction Using Remote Microwave Sensor Data"; May 9, 2015; pp. 187-197 (12 pp.).
Nanda, Saurav et al.; "Predicting Network Attack Patterns in SDN Using Machine Learning Approach"; 2016; 6 pp.
Nie, Laisen et al., "Traffic Matrix Predition and Estimation Based on Deep Learning in Large-Scale IP Backbone Networks"; Journal of Network and Computer Science, vol. 72; Dec. 2016; https://doi.org/10.1016/j.jnca.2016.10.006; 1 page.
Open Networking Foundation; "Software-Defined Networking: The New Norm for Networks"; ONF White Paper; Apr. 13, 2012; pp. 1-12.
Srihari, Sargur; "RNNs: Teacher Forcing"; Deep Learning: http://www.cedar.buffalo.edu/~srihari/CSE676; pp. 1-14.
Tajiki, Mohammad Mahdi et al.; Applied Sciences Article "Joint QoS and Congestion Control Based on Traffic Prediction in SDN"; Nov. 3, 2017; pp. 1-15.
VMware NSX; "The Network Virtualization and Security Platform"; VMware, Inc.; 2018; 4 pp.

\* cited by examiner

| clock | usage_value | avg_value | max_value | act_capacity |
|---|---|---|---|---|
| 2017-01-11 10:10 | 2.3214 | 22.123 | 34.12 | 953.164 |
| 2017-01-11 10:11 | 12.123 | 22.123 | 42.1 | 953.164 |
| 2017-01-11 10:12 | 8.1233 | 22.123 | 29.23 | 953.164 |
| 2017-01-11 10:13 | 2.1456 | 22.123 | 34.12 | 953.164 |
| 2017-01-11 10:14 | 7.873 | 22.123 | 45.3 | 953.164 |
| 2017-01-11 10:15 | 9.234 | 22.123 | 67.12 | 953.164 |
| 2017-01-11 10:16 | 10.2345 | 22.123 | 47.234 | 953.164 |
| 2017-01-11 10:17 | 6.823 | 22.123 | 51.217 | 953.164 |
| 2017-01-11 10:18 | 5.345 | 22.123 | 46.123 | 953.164 |
| 2017-01-11 10:19 | 2.98 | 22.123 | 52.134 | 953.164 |
| 2017-01-11 10:20 | 3.65 | 22.123 | 38.123 | 953.164 |

| clock | usage_value (x1) | avg_value (x2) | max_value (x3) | act_capacity (x4) | projected_usage (y) |
|---|---|---|---|---|---|
| 2017-01-11 10:10 | 2.3214 | 22.123 | 34.12 | 953.164 | 12.123 |
| 2017-01-11 10:11 | 12.123 | 22.123 | 42.1 | 953.164 | 8.1233 |
| 2017-01-11 10:12 | 8.1233 | 22.123 | 29.23 | 953.164 | 2.1456 |
| 2017-01-11 10:13 | 2.1456 | 22.123 | 34.12 | 953.164 | 7.873 |
| 2017-01-11 10:14 | 7.873 | 22.123 | 45.3 | 953.164 | 9.234 |
| 2017-01-11 10:15 | 9.234 | 22.123 | 67.12 | 953.164 | 10.2345 |
| 2017-01-11 10:16 | 10.2345 | 22.123 | 47.234 | 953.164 | 6.823 |
| 2017-01-11 10:17 | 6.823 | 22.123 | 51.217 | 953.164 | 5.345 |
| 2017-01-11 10:18 | 5.345 | 22.123 | 46.123 | 953.164 | 2.98 |
| 2017-01-11 10:19 | 2.98 | 22.123 | 52.134 | 953.164 | 3.65 |

SYSTEM AND METHOD TO LEARN AND PRESCRIBE NETWORK PATH FOR SDN

TECHNICAL FIELD

This disclosure relates generally to Software-Defined Networking (SDN) technology and, more particularly, to a Long Short-Term Memory Recurrent Neural Network (LSTM-RNN) based prediction of future usage of routers/switches in a communication network having an SDN architecture and a Deep Boltzmann Machine (DBM) based recommendation of a routing path within the network in view of the predicted future usage of the routers/switches.

BACKGROUND

The static architecture of a traditional communication network is ill-suited to accommodate the demands of flexibility and easy trouble-shooting needed to support the explosion of data traffic generated by modern communication entities such as, for example, mobile devices or smartphones, enterprise data centers, cloud-based content/service providers, virtualized servers, and so on. The Software-Defined Networking (SDN) technology transforms the traditional networking architecture to improve network performance and monitoring for the high-bandwidth, dynamic nature of today's applications. In a communication network having an SDN architecture, the control and data planes are decoupled. In other words, the forwarding process of network data packets (through the data plane) is disassociated from the routing process (through the control plane). As a result, in an SDN-based network, the network intelligence and state are logically centralized in the control plane, which may consist of one or more SDN controllers or the "brain" of the SDN network where the whole network intelligence is incorporated. The de-coupling also enables network control to become directly programmable, and the underlying infrastructure (of the data plane) to be abstracted from applications and network services. An SDN architecture may offer an efficient network configuration with increased programmability, automation, and network control, thereby enabling enterprises, wireless carriers, or other service providers to build highly scalable and flexible networks that readily adapt to changing business needs.

SUMMARY

This Summary provides a simplified form of concepts that are further described below in the Detailed Description. This Summary is not intended to identify key or essential features and should therefore not be used for determining or limiting the scope of the claimed subject matter.

In the context of an SDN architecture, the present disclosure relates to prediction of a router's expected usage (or utilization) in future based on an analysis of the router's historical usage over a given period of time in the past. Machine learning techniques such as, for example, the stacked Long Short-Term Memory Recurrent Neural Network (LSTM-RNN) model may be used to analyze the historical usage data to predict the future usage. The present disclosure also relates to using a deep learning model of neural networking, such as the Deep Boltzmann Machine (DBM) model, to recommend a routing path within an SDN network based on consideration of LSTM-RNN based predicted future usages of routers/switches in the network.

In one embodiment, the present disclosure is directed to a method, which comprises: (i) selecting, by a computing device, an LSTM-RNN model; (ii) training, by the computing device, the LSTM-RNN model based on a historical usage pattern of a routing element in a communication network having an SDN architecture; and (iii) predicting, by the computing device, future usage of the routing element over a pre-defined time period using the trained LSTM-RNN model. In one embodiment, the LSTM-RNN model may be a stacked LSTM-RNN model. In particular embodiments, the method also comprises using, by the computing device, a DBM model to suggest (or recommend) a routing path based on the predicted future usage of routers/switches in the network.

In another embodiment, the present disclosure is directed to a computing system, which comprises: a memory storing program instructions; and a processing unit coupled to the memory and operable to execute the program instructions. In the computing system, the program instructions, when executed by the processing unit, cause the computing system to: (i) select an LSTM-RNN model, (ii) train the LSTM-RNN model based on a historical usage pattern of a routing element in a communication network having an SDN architecture, and (iii) predict future usage of the routing element over a pre-defined time period using the trained LSTM-RNN model.

In a further embodiment, the present disclosure is directed to a computer program product comprising a non-transitory computer-usable medium having computer-readable program code embodied therein, wherein the computer-readable program code is adapted to be executed by a computing system to implement a method. The method comprises: (i) selecting an LSTM-RNN model; (ii) training the LSTM-RNN model based on a historical usage pattern of a routing element in a communication network having an SDN architecture; and (iii) predicting future usage of the routing element over a pre-defined time period using the trained LSTM-RNN model.

The path suggestion tool as per teachings of the present disclosure is an analytical, plug-and-play model that may be used in any type of SDN architecture to provide more insights into different routing paths based on the capacity usage of each router. The tool provides a robust and accurate framework to learn the usage patterns of various routers/switches in an SDN-based communication network and suggest routing paths based on the predicted future usage of the routers/switches. This framework can be also beneficial for logical build teams for configuration of a network and its capacity planning, and also for downgrading or upgrading the bandwidth in a cluster of routers.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

FIG. 5 is an exemplary table of historical usage data of a router for use in conjunction with FIGS. 6-9 to illustrate how an LSTM-RNN model in the path suggestion tool may be trained as per particular embodiments of the present disclosure.

FIG. 6 shows an exemplary illustration of how the values in the data table of FIG. 5 may be used to train an RNN model as per particular embodiments of the present disclosure.

DETAILED DESCRIPTION

Figure 1:
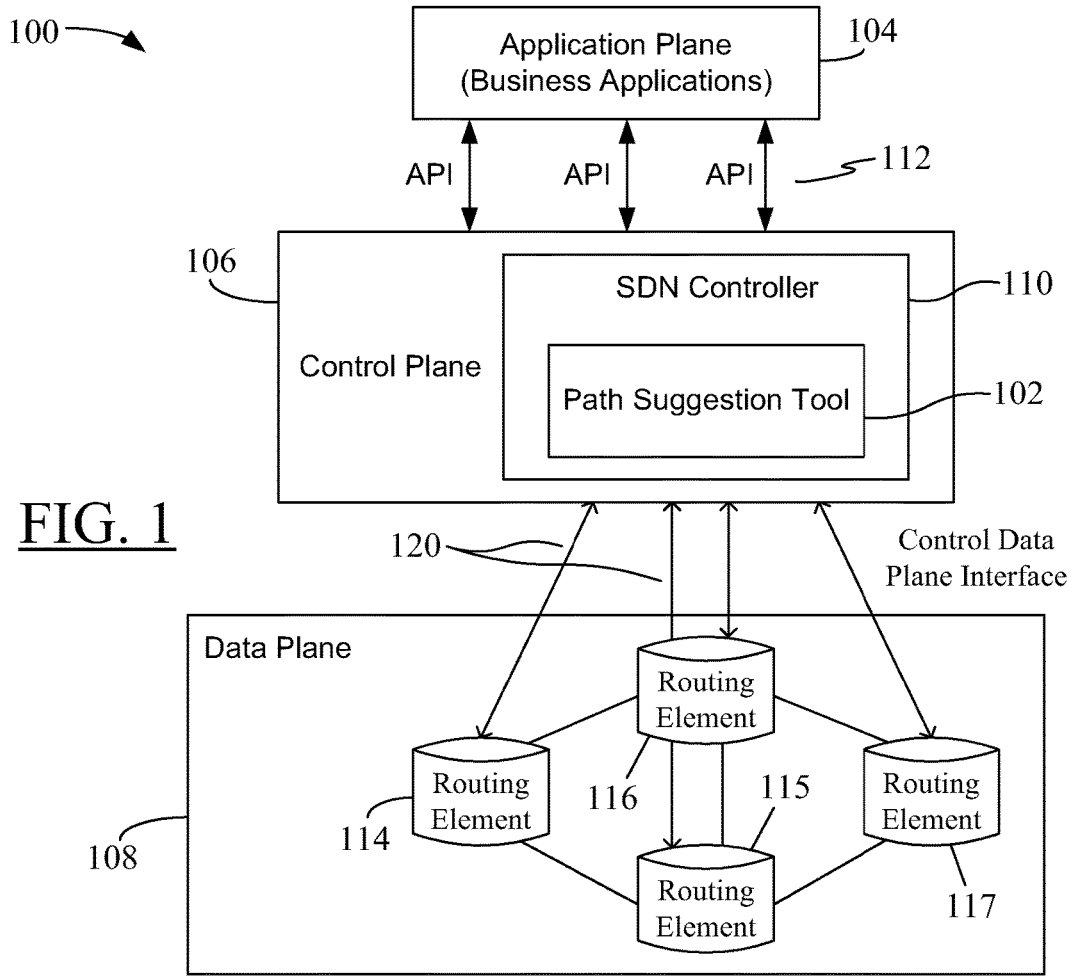
FIG. 1 shows logical view of an exemplary SDN architecture to implement packet routing using a path suggestion tool as per particular embodiments of the present disclosure.

An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, network control, airline reservations, enterprise data storage, or global communications. In addition, information handling systems may include a variety of hardware and software components that may be configured to process, store, and communicate information and may include one or more computer systems, data storage systems, and networking systems.

For purpose of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, a network controller, or any other suitable device, and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touch-screen and/or video display. The information handling system may also include one or more buses operable to transmit communications between the various hardware components.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism. Furthermore, a hyphenated term (e.g., "pre-defined", "computer-readable", etc.) may be occasionally interchangeably used with its non-hyphenated version (e.g., "predefined," "computer readable", etc.), and a capitalized entry (e.g., "Data Plane", "Control Plane," "Controller", etc.) may be interchangeably used with its non-capitalized version (e.g., "data plane," "control plane," "controller", etc.). Such occasional interchangeable uses shall not be considered inconsistent with each other.

In network traffic management, there may be a number of interrelated, yet technically-distinct, variables (or issues) that need to be taken into account when defining the overall behavior of a network. These issues or variables include, for example, route optimization, route latency, link bandwidth, link/router throughput, congestion control, link load, router utilization, Quality of Service (QoS) provisioning, and so on. Broadly speaking, optimized packet-routing for maximum flow may be the desired goal when each of the above-mentioned variables is evaluated. However, having a common goal with other variables/issues does not lessen the distinctiveness of an individual variable or issue. For example, route optimization does not necessarily address capacity management of associated routers; an optimized route may still have one or more underutilized routers. As another example, a link congestion does not necessarily translate to utilization of the associated router at full capacity; there may be a link failure not involving the router, or the congestion may be due to a mismatch between the router throughput and the link bandwidth.

The above issues are present not only in traditional networks, but also in the networks having an SDN architecture. Although SDN architectures offer distributed load balancing to achieve optimized packet flow, different approaches are followed in current SDN architectures for choosing the optimum routing paths. One approach is to consider the current utilization of the network bandwidth for choosing an optimum routing path. Another approach is to use the hashing operation on a large number of source and destination Internet Protocol (IP) addresses in determining an optimal network path. In yet another approach, trace out from the source IP address (of a data packet to be routed)

may be used to find out the routing path using a routing table. In one approach, equal-cost multi-path routing between two end points in an SDN network is supported by using overlay protocols based on current usage load of the routers in the network.

The above-mentioned approaches to network path selection in an SDN network are primarily based on current usage of routers/switches in the network or on a hash method. These approaches fail to consider any past trends (or history) of router usage and expected future utilization of routers in the network.

It is therefore desirable to devise a methodology of routing path selection within an SDN-based network that takes into account historical usage of routers/switches in the network, predicts the future utilization of routers/switches over a given period of time, and suggests a network path based on the predicted future usage.

The present disclosure relates to a plug-and-play model of router usage prediction in an SDN architecture based on machine learning techniques. In one embodiment, the present disclosure relates to analyzing the historical usage of each router with respect to time and predicting the router's expected usage in future. A path for end-to-end communication may be then recommended based on the predicted future usage determinations. The analytical framework may be based on neural networks (such as the stacked LSTM-RNN model) and deep learning methods of neural networking (such as the DBM model).

It is noted that the terms "network path" and "routing path" may be used interchangeably herein. Similarly, the terms "usage" and "utilization" may be used interchangeably herein when discussing a routing element's past, present, or future usage (or load). Furthermore, the terms "SDN-based network" or "SDN network" also may be used interchangeably herein to refer to a communication network having an SDN architecture (similar to the architecture shown in FIG. 1 and discussed below).

FIG. 1 shows logical view of an exemplary SDN architecture 100 to implement packet routing using a path suggestion tool 102 as per particular embodiments of the present disclosure. For ease of discussion, the terms "path suggestion tool", "path selection tool", "software tool", or other terms of similar import may be used interchangeably to refer to the system component 102 in FIG. 1. As discussed earlier, SDN architectures decouple network control and forwarding functions. Thus, the SDN architecture 100 may be comprised of three distinct hierarchical planes or layers: an application plane 104, a control plane 106, and a data plane 108. The application plane 104 may comprise a number of business applications (also referred to as "SDN applications"), which are programs that communicate their requirements for network services and desired network behavior to an SDN controller 110 in the control plane 106 via respective Application Programming Interfaces (APIs) 112. The SDN applications may operate on an abstracted view of the underlying network infrastructure (for example, the network elements in the data plane 108) for their internal decision-making purposes, thereby treating the network as a single logical or virtual entity. The APIs 112 may make it possible for a business enterprise/entity, carrier, or network operator to implement common network services such as, for example, routing, multicasting, security, access control, bandwidth management, traffic engineering, QoS provisioning, storage optimization, policy management, and so on, custom-tailored to meet business objectives.

Figure 11:
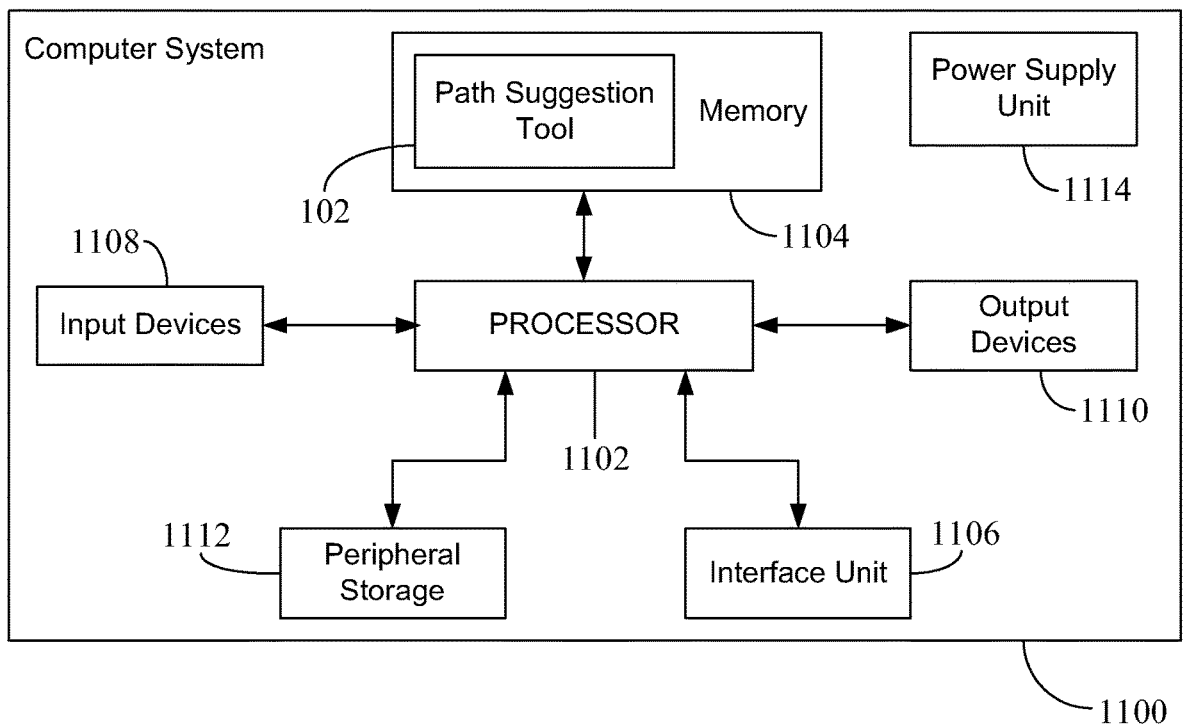
FIG. 11 illustrates an example configuration of a computer system that can be used to implement the path suggestion tool described herein.

As mentioned earlier, in an SDN architecture, the network intelligence may be logically centralized in the control plane, which may consist of one or more SDN controllers or the "brain" of the SDN network. In the SDN architecture 100 of FIG. 1, one such SDN controller 110 is shown. However, in other embodiments, additional SDN controllers may be present in the control plane 106 and operating in an distributed processing environment. In that case, the SDN controller 110 in FIG. 1 may be considered to collectively represent such additional controllers. The SDN controller 110 may maintain a global view of the underlying network to: (i) translate the requirements from the SDN application layer 104 down to the routing elements 114-117 in the data plane 108, and (ii) provide the SDN applications with an abstracted view of the network (which may include statistics and events related to the network). The SDN controller's 110 centralized intelligence may allow network operators and administrators to alter the network behavior in real-time and deploy new applications and network services in a matter of hours or days. Thus, the SDN controller 110 may provide a network manager with the flexibility to configure, manage, secure, and optimize network resources via dynamic, automated SDN programs such as, for example, the path suggestion tool 102 as per teachings of the present disclosure. In particular embodiments, the SDN controller 110 itself may be an information handling system (discussed earlier) and the program code constituting the software tool 102 may be stored in a storage unit or memory (not shown) in the SDN controller 110. Such memory, processor, and other exemplary architectural details of the SDN controller 110 are shown in FIG. 11 and discussed later below. In one embodiment, the SDN controller 110 may include the program code that provides the SDN controller functionality in the SDN architecture 100. In certain embodiments, the SDN controller 110 may be a logical or virtual entity (such as, for example, the VMware NSX® platform available from VMware, Inc. of Palo Alto, Calif.) that is implemented using an information handling system (not shown). In that case, the functionality of the path suggestion tool 102 may form a part of the SDN controller functionality being implemented.

The path suggestion tool 102 may be a software application comprising program code, which, upon execution by a processor (not shown) in the SDN controller 110 or other appropriate information handling system implementing the functionality of the SDN controller 110, may cause the SDN controller 110 or the information handling system to perform various operational tasks discussed below with reference to FIGS. 2-10. In some embodiments, the path selection tool 102 may be implemented in the control plane 106, but not as part of the SDN controller 110. In that case, the program code of the path selection tool 102 may be executed by the SDN controller 110 or other appropriate information handling system (not shown) in the control plane 106 to enable the SDN controller 110 or the information handling system to perform various operational tasks discussed below with reference to FIGS. 2-10.

The data plane 108 may represent the infrastructure layer of the underlying communication network having the SDN architecture 100. As shown, in one embodiment, the data plane 108 may comprise the routing elements 114-117 for data forwarding within as well as out of the network. For ease of illustration, only four routing elements are shown in FIG. 1. However, it is understood that there may be hundreds of routing elements forming the actual data forwarding platform of the network. It is noted that the terms "routing element" and "network element" may be occasionally used interchangeably herein. Some exemplary routing or network elements in the embodiment of FIG. 1 include network switches and routers, both physical and virtual (hypervisor-based). Although only the term "router" may be used below to refer to a routing element, it is understood that the related discussion equally applies to a switch or any other network device having routing functionality. In some embodiments, a routing element may be contained in a network device having an integrated physical combination of communications resources, managed as a unit. In other embodiments, the functionality of a single routing element may be defined across multiple physical network devices. The architectural configuration of a routing element or its implementation details (physical, logical, and/or virtual) are not relevant to the present disclosure and, hence, no additional discussion thereof is provided here.

As shown in FIG. 1, the routing elements 114-117 may be interconnected with each other and also in operative communication with the control plane 106 to carry out the necessary packet forwarding. The interconnections shown in FIG. 1 are merely exemplary in nature and do not imply that the shown interconnections are the only way to interconnect the routing elements 114-117. In particular embodiments, the routing elements 114-117 may communicate with the SDN controller 110 in the control plane 106 via respective control-data plane interfaces, which are collectively identified using the reference numeral 120 in FIG. 1. Each interface 120 may be defined between the control and forwarding layers of an SDN architecture and may provide at least the following: (i) programmatic control of all data forwarding operations, (ii) routing element's capabilities advertisement, (iii) statistics reporting by the routing element, and (iv) event notification to/from the SDN controller 110. In one embodiment, the interfaces 120 may be implemented in an open, vendor-neutral, and interoperable manner such as, for example, using the OpenFlow® communication interface specified by the Open Networking Foundation (ONF) of Menlo Park, Calif.

Figure 2:
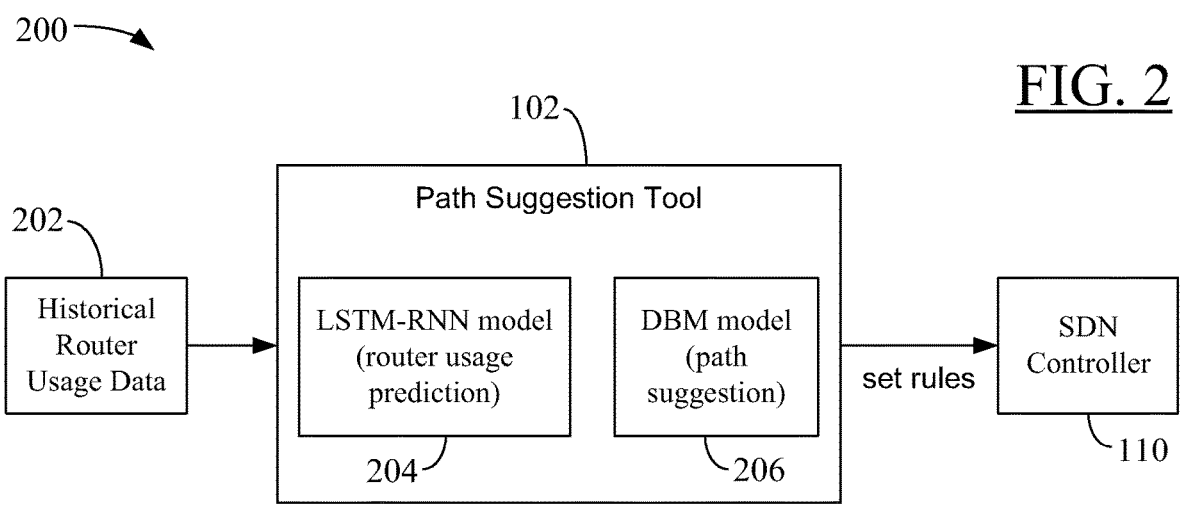
FIG. 2 depicts an exemplary block diagram showing how the path suggestion tool as per particular embodiments of the present disclosure may be implemented in the control plane of an SDN architecture.

FIG. 2 depicts an exemplary block diagram 200 showing how the path suggestion tool 102 as per particular embodiments of the present disclosure may be implemented in the control plane of an SDN architecture, such as the SDN architecture 100 of FIG. 1. In FIG. 2, the path suggestion tool 102 is not shown as part of the SDN controller 110 merely to illustrate the operational aspects of the tool 102 and its contribution to the controller functionality. However, as discussed before, the software tool 102 may be a part of the SDN controller 110 as in case of the embodiment in FIG. 1, or may be an entity implemented separately from the SDN controller 110. As shown in FIG. 2, in one embodiment, the path suggestion tool 102 may receive historical router usage data 202, such as, for example, from router utilization data logs maintained by the SDN controller 110 as discussed later with reference to FIG. 4. An LSTM-RNN model 204 in the path suggestion tool 102 may analyze the received historical usage data 202 of each routing element in the network to predict usage of the corresponding routing element over a specified period of time in future. The predicted utilization of all routing elements within the network may be provided to a DBM model 206 in the suggestion tool 102. When a routing path for a data packet is to be determined, the DBM model 206 may use the predicted usage information to recommend a routing path for the data packet. The recommended routing path(s) may define packet forwarding rules on the SDN controller 110 for implementation through the appropriate control-data plane interface(s) 120. Additional exemplary operational details of the LSTM-RNN model 204 are provided below with reference to FIGS. 4-9 and of the DBM model are provided below with reference to FIG. 10.

Figure 3:
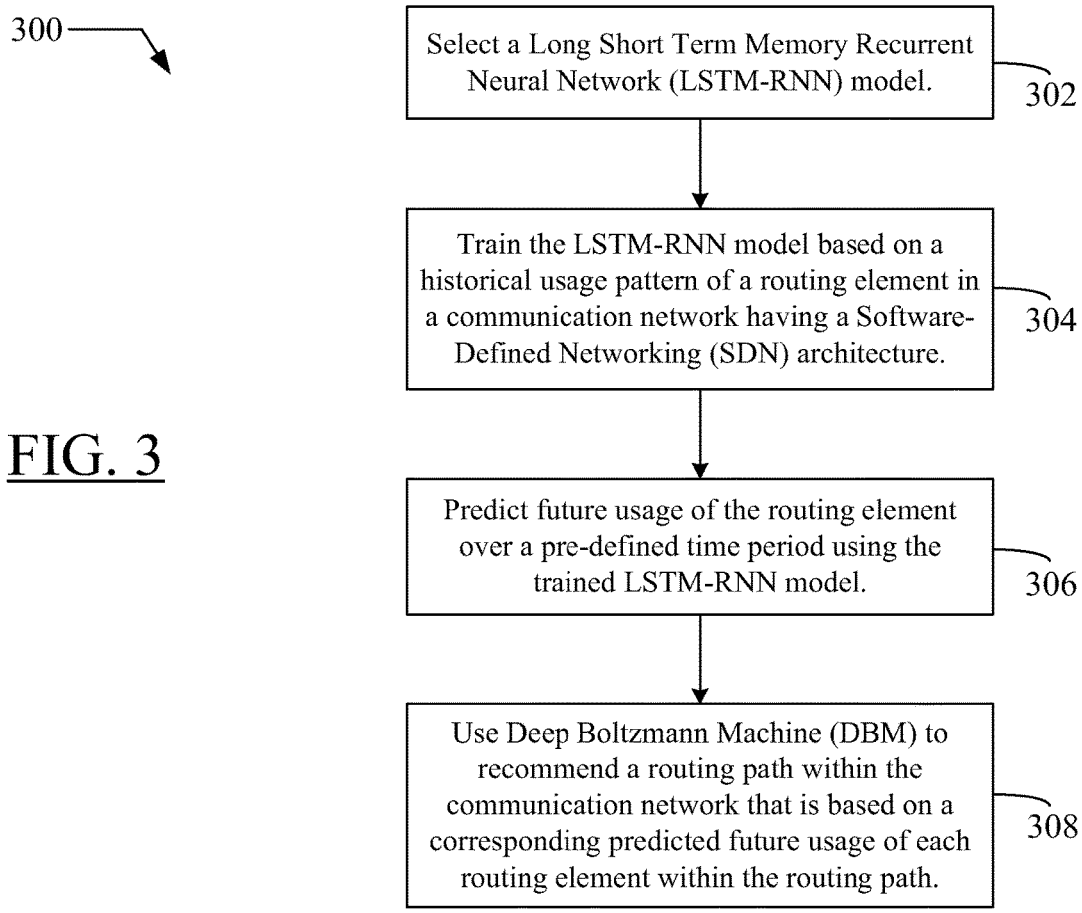
FIG. 3 is an exemplary flowchart depicting various steps that may be performed by a computing system as per particular embodiments of the present disclosure to carry out routing using various Neural Network (NN) models.

FIG. 3 is an exemplary flowchart 300 depicting various steps that may be performed by a computing system as per particular embodiments of the present disclosure to carry out routing using various Neural Network (NN) models, such as the LSTM-RNN model 204 and the DBM model 206 in FIG. 2. The computing system may be the SDN controller 110 shown in FIG. 1 or any other information-handling system operating within the control plane 106 of the SDN architecture 100. In the discussion below, the SDN controller 110 is used by way of an example of the computing system performing the steps shown in FIG. 3. Hence, the same reference numeral "110" is used to refer to the computing system discussed with reference to FIG. 3. It is noted that the computing system, such as the SDN controller 110, may include in hardware and/or software the functionality of the software tool 102. In one embodiment, the program code for the software tool 102 (and other relevant program code such as the program code for an operating system) may be executed by a processor (not shown) in the computing system 110 and, upon execution of the program code, the computing system 110 may be operative to perform the tasks illustrated in FIG. 3.

Figure 4:
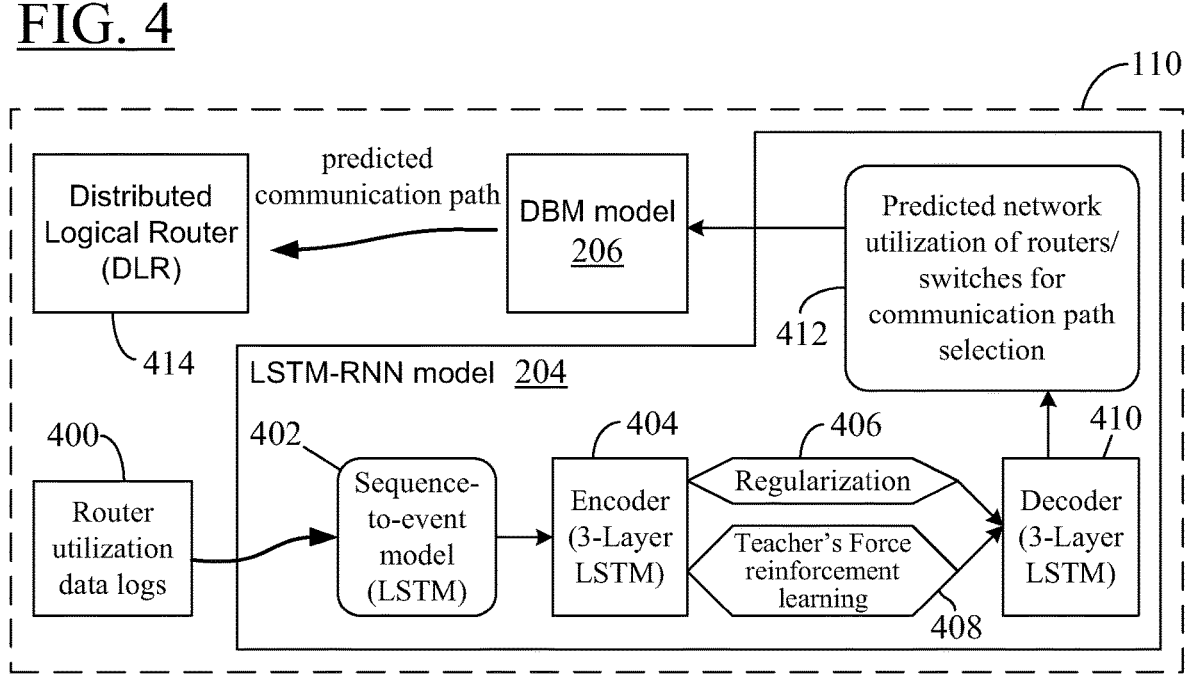
FIG. 4 shows exemplary architectural details of an SDN controller with the path suggestion tool as per particular embodiments of the present disclosure.

Initially, the computing system 110 may select an LSTM-RNN model (such as the model 204 in FIG. 2), as noted at block 302. Exemplary architectural details of the LSTM-RNN model 204 are shown in FIG. 4, which is discussed later below. At block 304, the computing system 110 may train the LSTM-RNN model 204 based on the historical usage pattern of a routing element, such as the routing element 114 in FIG. 1, in a communication network having an SDN architecture, like the SDN architecture 100 in FIG. 1. In one embodiment, the router usage history of the past three (3) years may be taken into account for training the NN model 204. Exemplary details of the training of the LSTM-RNN model 204 for the routing element 114 are provided below with reference to discussion of FIGS. 5-9. Subsequently, the computing system 110 may predict future usage (or utilization) of the routing element 114 over a pre-defined time period—for example, over the next four weeks—using the trained LSTM-RNN model, as noted at block 306. The training at block 304 and the prediction at block 306 may be carried out for each routing element in the network using a corresponding LSTM-RNN model. For ease of discussion, the reference numeral "204" is used in FIG. 2 (and in other figures) to collectively refer to all such router-specific LSTM-RNN prediction models or router-specific operational instances of a single LSTM-RNN model. In one embodiment, the computing system 110 may use the DBM model 206 to recommend a routing path within the communication network that is based on a corresponding predicted future usage of each routing element within the routing path (block 308). In this manner, a routing path may be selected for a data packet based on the predicted utilization of the routers in the network.

FIG. 4 shows exemplary architectural details of an SDN controller—such as the SDN controller 110 in FIG. 1—with the path suggestion tool 102 as per particular embodiments of the present disclosure. In FIG. 4, the LSTM-RNN model 204 and the DBM model 206 collectively represent the path suggestion tool 102. In one embodiment, the SDN controller 110 may include router-specific utilization data logs 400 for each router (or routing element) in the network. Thus, in the context of FIG. 1, the data logs 400 in FIG. 4 may include historical usage data for each of the routing elements 114-117. As shown at block 202 in FIG. 2, such historical usage data may be supplied to the software tool 102. In one embodiment, the data logs 400 may provide historical data of a router's per-minute usage over the past 3 years for training a neural network (NN), such as an RNN, implemented through the software tool 102. In other embodiments, the past usage data over a different time period may be considered. As mentioned later with reference to FIG. 8, a stacked LSTM model 402 may be implemented as part of training the RNN to take into account long term time dependencies. In the embodiment of FIG. 4, the depth of the LSTM model 402 may be three (3) layers: an input layer, a hidden layer (also known as an LSTM layer with memory blocks), and an output layer. However, in other embodiments, LSTM models having other depths may be used. The LSTM model 402 may be a sequence-to-event model that operates/trains on the input sequence of past usage data received from the data logs 400 to enable prediction of future events (here, the future usage pattern for each router in the network). An encoder, such as a 3-layer LSTM encoder 404, may encode each input sequence of router-specific data into fixed length by padding the input sequence of data with additional 0s to make each input sequence having a fixed length, which, in some embodiment, may be equal to the number of input cells (not shown) of the encoder 404. To get more accurate prediction, the fixed length data pattern may be regularized at block 406 and reinforcement learning may be performed at block 408 using the Teacher's Force method. The trained content may be decoded (which may include removing the additional 0s padded by the encoder 404) using a 3-layer LSTM decoder 410 into the number of days in future for which usage prediction is expected for each router. In one embodiment, the trained LSTM-RNN models may predict future usage (or utilization) of each routing element 114-117 over a pre-defined time period such as, for example, over the next four (4) weeks.

As mentioned before, for ease of discussion, the reference numeral "204" is used in FIG. 2 (and also in other figures) to collectively refer to all router-specific LSTM-RNN prediction models. Alternatively, in particular embodiments, the reference numeral "204" may collectively represent multiple instances of a single LSTM-RNN model—each instance may be specifically trained for a distinct routing element. The predicted network utilization of each router/switch in the network may be provided to the DBM model 206 for communication path selection, as noted at block 412 in FIG. 4. As discussed later with reference to FIG. 10, the DBM model 206 may evaluate the predicted future usages of corresponding routing elements forming its hidden layer(s) to recommend a routing path for a data packet within the communication network based on the source and destination IP addresses of the data packet. In one embodiment, the SDN controller 110 may include a Distributed Logical Router (DLR) 414, and the DBM model 206 may supply the predicted routing path for each data packet to the DLR 414 to manage the eventual routing of the data packet within the network (or to the edge of the network) via appropriate routing elements 114-117 forming the recommended routing path.

FIG. 5 is an exemplary table 500 of historical usage data of a router for use in conjunction with FIGS. 6-9 to illustrate how an LSTM-RNN model, such as the model 204 in FIG. 4, in the path suggestion tool 102 may be trained as per particular embodiments of the present disclosure. For the sake of discussion and by way of an example only, the table 500 may be considered to represent historical usage of the routing element 114 in FIG. 1. It is understood that other routing elements 115-117 may have similar historical usage data associated therewith, and the corresponding LSTM-RNN models—like the model 20—may be trained on these data in the manner similar to the manner discussed here with reference to FIGS. 5-9 for the routing element 114. In one embodiment, the table 500 may contain data stored in the router utilization data logs 400 (FIG. 4), which may have data related to many different network attributes such as, for example, "site country," "host name", "bandwidth utilization metrics", and so on. The "bandwidth utilization metrics" may relate to router usage data and, hence, may be relevant to the present discussion. Some exemplary bandwidth utilization metrics include the name (or identity) of the network service provider, a clock (or timestamp) value, a usage value, an average value, a maximum value, and an actual maximum capacity value. In some embodiments, there may be two sets of bandwidth utilization metrics for a routing element—one measuring the amount of data uploaded (or input) into the routing element (the "Percent_In" set) and the other related to the amount of data downloaded (or output) from the routing element (the "Percent_Out" set).

In the table 500 in FIG. 5, exemplary data for five (5) different bandwidth utilization metrics—"clock value," "usage value", "average value", "maximum value," and "actual capacity"—in the "Percent_Out" set for the routing element 114 are provided in the rows of columns 502-506, respectively. In other embodiments, a neural network may be trained on "Percent_In" data values as well, using the approach similar to that discussed below with reference to FIGS. 6-9. The "clock values" in column 502 may provide timestamps—for example, date and time—for the associated set of data values in other columns 503-506. The router usage data in each of the columns 503-506 may be measured in terms of Mega Bytes (MBs). Other units of measurement may be used in certain embodiments. The "usage value" metric (column 503) may represent the current Percent_Out usage (measured in MBs) of the routing element 114 at a given time instant. On the other hand, the "average value" metric (column 504) may represent the average Percent_Out usage (measured in MBs) of the routing element 114 in the last one hour. The "maximum value" metric (column 505) may represent the maximum Percent_Out usage (measured in MBs) the routing element 114 has experienced in the last one hour. Finally, the "actual capacity" metric (column 506) may represent the actual Percent_Out data utilization capacity (measured in MBs) of the routing element 114.

As shown, in the embodiment of FIG. 5, the metrics data in columns 503-506 are timestamped every minute—starting with the clock time 10:10 and ending with the clock time 10:20 on the same date in column 502. In other embodiments, the timestamp interval may be different. In particular embodiments, various router utilization data may be stored in the data logs 400 at the specified timestamping interval—here, for example, every minute. It is observed here that the table 500 in FIG. 5 contains merely a sample or snapshot of the historical usage data of the routing element 114. As noted before, in particular embodiments, the LSTM-RNN model 204 may be trained on the routing element's 114 per-minute usage over the past three (3) years. Thus, in practice, the table 500 may contain thousands of entries to represent the historical usage over the past 3 years. Furthermore, in some embodiments, the training of the RNN model 204 may be an on-going process to make the software tool 102 more accurate in its predictions. In that case, the data table 500 in FIG. 5 may be dynamically updated every minute to contain the historical data of the past three (3) years going back from the most-recent time instant. For example, at time instant "t", the table 500 may contain minute-by-minute usage data starting with the time instant "t" and going back 3 years from the time instant "t"; at time instant "t+1 minute", the table 500 may contain minute-by-minute usage data starting with time instant "t+1 minute" and going back 3 years from the time instant "t+1 minute"; and so on. In this manner, an NN model may be continually trained to improve its predictions with more data getting accumulated in the system.

FIG. 6 shows an exemplary illustration 600 of how the values in the data table 500 of FIG. 5 may be used to train an RNN model, such as the LSTM-RNN model 204 in FIG. 4, as per particular embodiments of the present disclosure. The contents of the columns 502-506 in FIG. 6 are the same as those shown in FIG. 5, except that the data for the last row (at clock value "10:20") are not included in these columns in FIG. 6 as explained below. As discussed in more detail later, in the NN training phase, the values in columns 503-506 may be supplied as inputs "x1" through "x4", respectively, to an input layer (not shown) of the NN model—here, the LSTM-RNN model 204. For each set of time instant-specific input values "x1" through "x4", the NN model may be trained to generate a "projected usage" value for the routing element 114 as an output "y". In FIG. 6, all such projected values are given in the column 602. It is observed that the projected usage (y) at a time instant "t" is in fact the actual router utilization value (input "x1") at the immediately-succeeding time instant "t+1." Hence, the data for the last row (at clock value "10:20") in table 500 (FIG. 5) are not included in the columns in FIG. 6 because of the inclusion of the usage value "3.65" (at the clock value "10:20") as the output "y" at the clock value "10:19". In other words, through the projected usage (output "y") at a time instant "t−1", the usage value (input "x1") at a time instant "t" may be made dependent on the inputs "x1" through "x4" associated with the time instant "t−1". This temporal correlation or time-dependence between two adjacent sets of historical router usage values may be used to train an NN model, as discussed below with reference to FIGS. 7-9.

Figure 7:
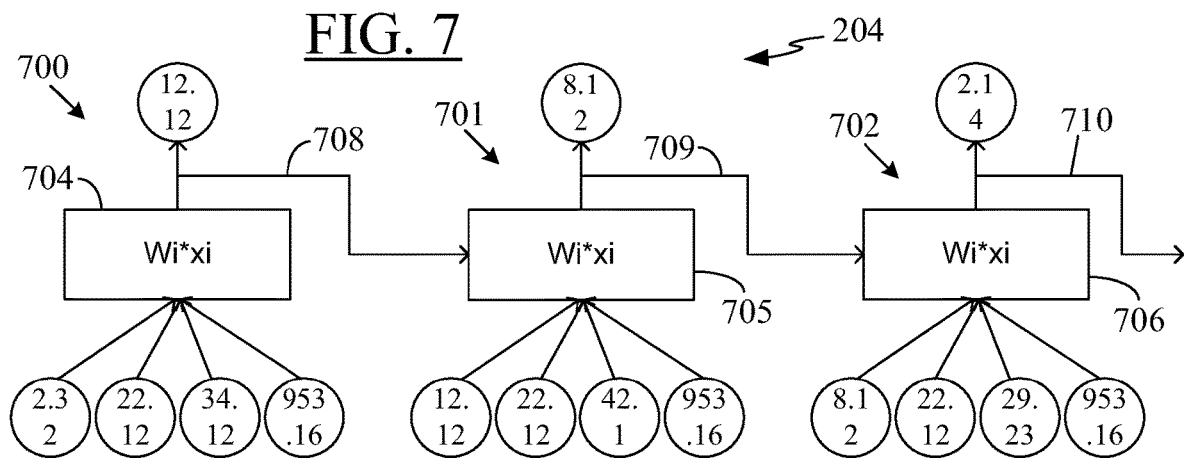
FIG. 7 illustrates exemplary training stages of an RNN model using the data values shown in FIG. 6 as per certain embodiments of the present disclosure.

FIG. 7 illustrates exemplary training stages of an RNN model using the data values shown in FIG. 6 as per certain embodiments of the present disclosure. The reference numeral "204" is used in FIG. 7 to indicate that the training stages shown in FIG. 7 broadly relate to the LSTM-RNN model 204 (or an instance of the model 204) in FIGS. 2 and 4, even though the model shown in FIG. 7 is simply an RNN model prior to its implementation as a stacked LSTM-RNN model shown in FIG. 8. In FIG. 7, three exemplary training stages 700-702, each having a depth of three (3) layers (an input layer, a hidden layer, and an output layer), are shown. Each training stage 700-702 represents the training state of the RNN model 204 (for the routing element 114) at a specific instant in time. The input values "x1" through "x4" in columns 503-506 for a specific clock value may represent the input layer of the training stage associated with that clock value. For example, the data values "x1" through "x4" for the clock timestamp "10:10" in FIG. 6 comprise the input layer for the training stage 700, the data values "x1" through "x4" for the clock timestamp "10:11" in FIG. 6 comprise the input layer for the training stage 701, and so on. These data values are shown by circled numbers, each number truncated to two digits after the decimal point for the simplicity of the drawing. At the hidden layer of each training stage, an appropriate weight ("Wi") may be applied to the corresponding $i^{th}$ input value ("xi"), as symbolically illustrated by the blocks 704-706 in FIG. 7. In particular embodiments, the weights ("Wi") may be determined by the neural network model and changed continuously until the output error falls below a preset threshold. The output layer of each training stage 700-702 may be the corresponding projected usage value ("y") in column 602 in FIG. 6. For example, for the training stage 700 associated with the timestamp value "10:10" in the top-most row in FIG. 6, the generated output will be the projected usage value "12.12" given as the first entry in the column 602 in FIG. 6. Other projected values are similarly shown as outputs of corresponding training stages in FIG. 7. Like the inputs ("xi"), the outputs ("y") are also shown as circled numbers, each number truncated to two digits after the decimal point for the simplicity of the drawing.

As mentioned before with reference to FIG. 6, during the training phase, each time-wise preceding stage of the RNN model 204 may be trained to output a projected usage value ("y") that is the actual usage value received by the time-wise succeeding stage as its input "x1". In other words, the projected usage (y) at a time instant "t" may be the actual router utilization value (input "x1") at the immediately-succeeding time instant "t+1." As shown by arrows 708-710 in FIG. 7, the output of one stage may be passed as an input to the hidden layer of the next stage in the model to establish temporal correlation between two adjacent sets of historical router usage values. Thus, through the projected usage (output "y") at a time instant "t−1", the actual usage value (input "x1") at a time instant "t" may be made dependent on the inputs "x1" through "x4" associated with the earlier time instant "t−1". More generally, during the training phase, an NN model may be supervised to learn from the data by presenting the training data at the input layer and dynamically adjusting the parameters of the NN to achieve the desired output value for the input set using, for example, backpropagation of the error from the output of one stage to the input of the next stage, where the weights are changed continuously until the output error falls below a preset value. In this manner, the NN model may learn correlated patterns between input data sets and the corresponding target values. This enables the NN model to predict an output when presented with a new, unseen input at run time.

Figure 8:
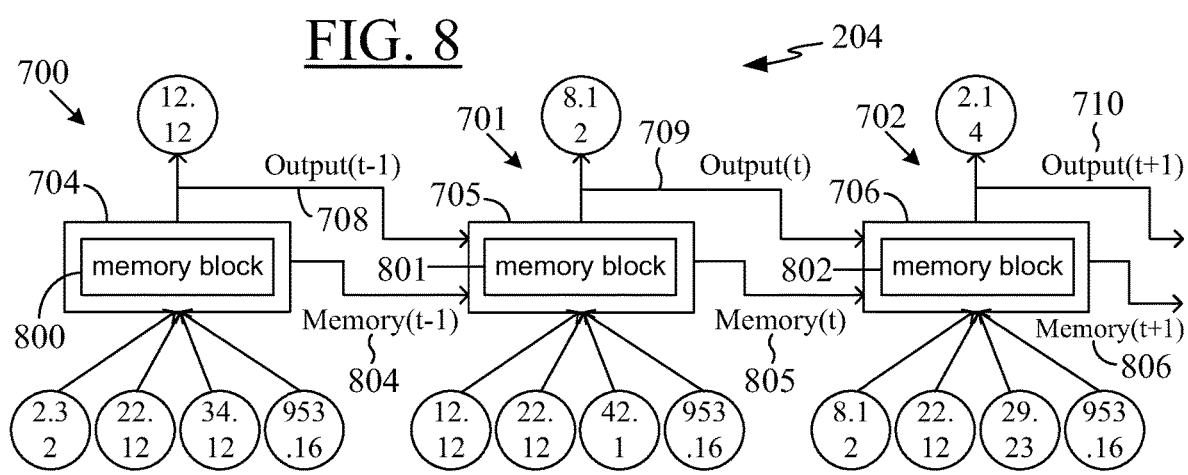
FIG. 8 depicts exemplary stages of a stacked LSTM-RNN model that is based on the RNN model of FIG. 7 as per particular embodiments of the present disclosure.
Figure 9:
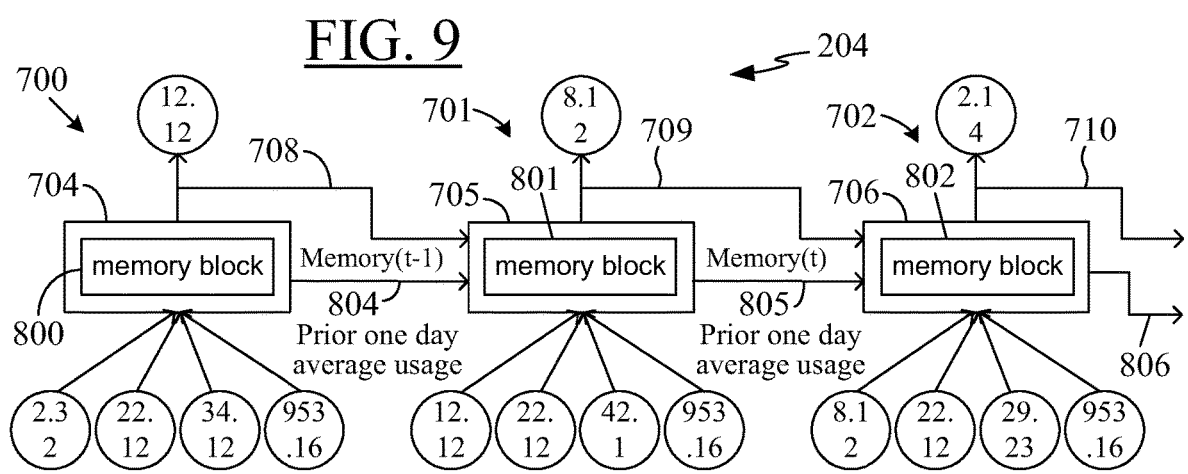
FIG. 9 shows the stacked LSTM-RNN model of FIG. 8 implementing the Teacher's Force method as per certain embodiments of the present disclosure.

FIG. 8 depicts exemplary stages of a stacked LSTM-RNN model that is based on the RNN model of FIG. 7 as per particular embodiments of the present disclosure. For ease of discussion, the same reference numerals are used in FIGS. 7 and 8 to refer to identical or functionally similar elements/features because the stacked LSTM-RNN model 204 in FIG. 8 (and also in FIGS. 2 and 4) is essentially a modified version of the RNN model of FIG. 7. In other words, the LSTM-RNN model in FIG. 8 is essentially an RNN model of FIG. 7 composed of LSTM units. An LSTM unit is a model for the short-term memory which can last for a long period of time. The discussion of features common between FIGS. 7 and 8 is not repeated here for the sake of brevity. It is noted here that FIGS. 7-9 illustrate progressive evolution of an RNN model for training on the router usage data. As mentioned earlier, a traditional RNN model, like the model shown in FIG. 7, may contain stages that feed back the network activations from a previous time step as inputs to influence predictions at the current time step. These activations may be stored in the internal states of the network as temporal contextual information. However, a traditional RNN model does not hold long-term time dependencies and, hence, it limits the RNN model's capability to model the long range context dependencies to 5-10 discrete time steps between relevant input signals and output. Therefore, the RNN model of FIG. 7 may be "upgraded" into the stacked LSTM-RNN model of FIG. 8 to learn the time dependencies of the entire past usage of routers over a long period of time—here, three (3) years. The hidden layer of each stage in a stacked LSTM-RNN model may be composed of a unit called a memory block. Three such memory blocks 800-802 for respective training stages 700-702 are shown in FIG. 8 for the stacked LSTM-RNN model 204. Each memory block 800-802 may contain memory cells (not shown) with self-connections memorizing (remembering) the temporal state of the network, and special multiplicative gating units to control information flow in the block. Generally, each memory block 800-802 may contain an input gate (not shown) to control the flow of input activations into a memory cell, an output gate (not shown) to control the output flow of cell activations into the rest of the network, and a forget gate (not shown) to adaptively "forget" or reset a cell's memory to prevent the internal cell values growing without bound when processing data in a continual time series that may not be previously segmented.

The arrows 804-806 in FIG. 8 illustrate that the previous usage time data stored in a memory block—representing the temporal state of the network at a specific time instant "t−1", "t", and "t+1", respectively—is fed from one NN stage to the next in the stacked LSTM-RNN model 204 to enable the model to learn the time dependencies of the entire usage of a routing element—here, the routing element 114 (FIG. 1)—over a long period of time (here, 3 years).

FIG. 9 shows the stacked LSTM-RNN model 204 of FIG. 8 implementing the Teacher's Force method as per certain embodiments of the present disclosure. For ease of discussion, the same reference numerals are used in FIGS. 8 and 9 to refer to the identical or functionally similar elements/features, and the discussion of features common between FIGS. 8 and 9 is not repeated here for the sake of brevity. As discussed before, in particular embodiments, the length of the input sequence of data—used for training the LSTM-RNN model 204—may be the whole past three (3) years' usage data of the routing element 114. The encoder 404 (FIG. 4) may encode the input data into a fixed length data pattern. As noted before, to get more accurate prediction, in particular embodiments, the fixed length data pattern may be regularized (at block 406 in FIG. 4) and reinforcement learning may be performed (at block 408 in FIG. 4) using the Teacher's Force method to enable the usage prediction for the routing element 114 over a pre-defined time period in future from a given time instant, such as, for example, over the next four (4) weeks, or over the next two (2) weeks, and the like. The Teacher's Force method may be implemented in the stacked LSTM-RNN model of FIG. 8 because RNN prediction may not be always accurate even though the prediction is dependent on the prior usage value. Therefore, for more accurate prediction, the Teacher's Force method may be used in the model 204 of FIG. 8 to pass the past entire one day's average usage value—that is, the input "x2" in column 504 in FIG. 6 evaluated over a period of the past 24 hours starting with a specific time instant "t−1", "t", and "t+1"—as an input at each of the arrows 804-806 in FIG. 9, as shown. In one embodiment, the input under the Teacher's Force method may be in addition to the time instant-specific output from the corresponding memory block 800-802 discussed earlier with reference to FIG. 8.

The embodiment in FIG. 9 may result in the trained LSTM-RNN model 204 (or an instance of the model 204), which may be able to predict future usage (or utilization) of the routing element 114 (FIG. 1) over a pre-defined time period such as, for example, over the next four (4) weeks. A similar NN model (or an instance of the model) may be selected and trained for each of the other routing elements 115-117. As noted before, for ease of discussion, the reference numeral "204" is used in FIG. 2 (and also in FIGS. 4-9) to collectively refer to all such router-specific NN prediction models or to all such router-specific instances of a single NN prediction model. The predictions of all router-specific NN models—like the model 204 in FIG. 9 for the routing element 114—or router-specific NN instances may provide an insight into the future usage patterns of each router/switch in an SDN-based network and also into the future utilization of each router in each routing path that may be selected in the network. The overall network utilization in future also may be predicted based on the predicted future usages of routers/switches in the network, as noted at block 412 in FIG. 4.

Figure 10:
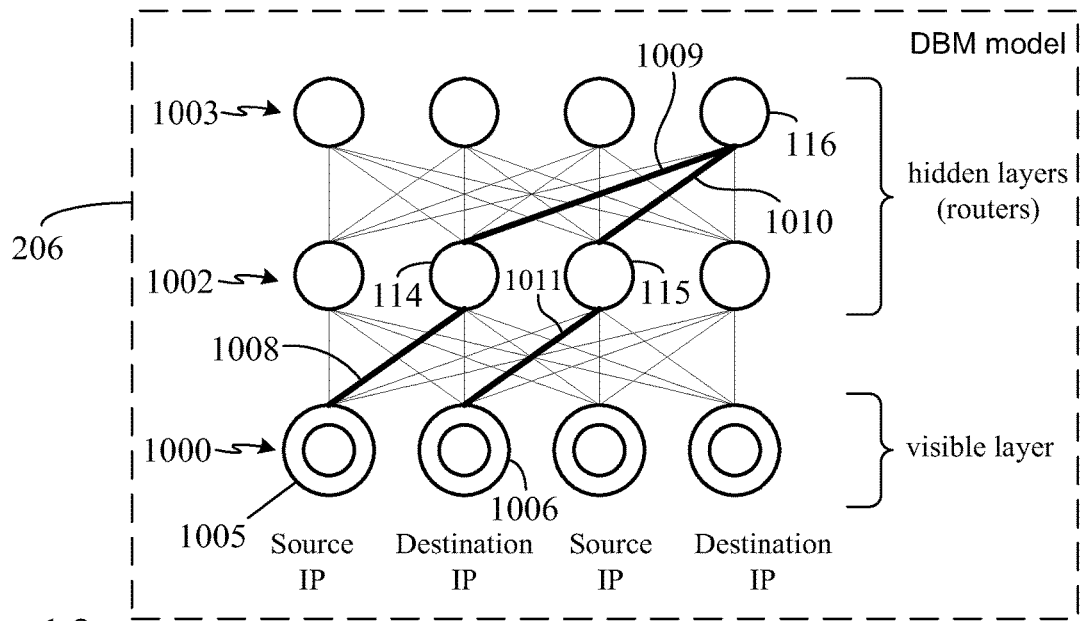
FIG. 10 is an exemplary illustration of various layers in a DBM model as per particular embodiments of the present disclosure.

FIG. 10 is an exemplary illustration of various layers in a DBM model, such as the DBM model 206 in FIGS. 2 and 4, as per particular embodiments of the present disclosure. A DBM model is a type of stochastic RNN with multiple layers of hidden random variables. As shown, the DBM model 206 may include one visible layer 1000 and multiple hidden layers 1002-1003. Although two hidden layers 1002-1003 are shown in FIG. 10, it is understood that more than two hidden layers may be present in other implementations. In the embodiment of FIG. 10, the source IP address and destination IP address of each data packet to be routed through the routers in the data plane 108 of the SDN architecture 100 in FIG. 1 may be provided as separate "units" of the visible layer 1000. Two such units of the visible layer 1000 are identified using reference numerals "1005" and "1006" in FIG. 10 associated with a single data packet presented to the network for routing. In the embodiment of FIG. 10, the routing elements within the data plane 108 (FIG. 1) may form the "units" of the hidden layers 1002-1003. Only three such routing elements 114-116 are identified in FIG. 10 for ease of illustration and simplicity of discussion. It is observed here that units of the same hidden layer—for example, the layer 1002 or the 1003—may not be connected or linked with one another in the DBM model 206. However, units of one hidden layer may be connected to the units of the other hidden layer, as shown. The LSTN-RMM model 204 may provide the predicted network utilization of each router/switch in the network to the corresponding units in the hidden layers 1002-1003 of the DBM model 206 for communication path selection The DBM model 206 may evaluate the predicted future usages of corresponding routing elements forming its hidden layer(s) to recommend a routing path for a data packet within the communication network based on the source and destination IP addresses of the data packet. For example, as shown by darkened lines 1008-1011 in FIG. 10, the routing path determined by the DBM model 206 for the data packet having the source and destination IP addresses 10015-1006, respectively, may include the routing elements 114-116. The routing path may include the flow of the data packet from the routing element 114 to the routing element 116, and then from the routing element 116 to the routing element 115, as shown. Similarly, routing paths for other data packets also may be suggested by the DBM model 206 based on the high order correlation between the activities of its hidden neurons (here, routers in the layers 1002-1003). In one embodiment, the DBM model 206 may recommend a routing path—for example, the routing path shown by lines 1008-1011—that is based on a corresponding predicted future usage of each routing element—here, the routing elements 114-116—within the routing path. More generally, the DBM model 206 may recommend a routing path within the communication network based on predicted future usages of all routing elements in the communication network. In this manner, a path for end-to-end communication may be provided based on forecasted utilization of each router/switch.

FIG. 11 illustrates an example configuration of a computer system 1100 that can be used to implement the path suggestion tool 102 described herein. The computer system (or computing device) 1100 may be suitably configured to implement the functionality of the software tool 102 according to the teachings of the present disclosure. The computer system 1100 may include one or more processors 1102, a memory unit 1104, an interface unit 1106 providing communication interfaces, one or more input devices 1108, one or more output devices 1110, and a peripheral storage unit 1112, connected to the processor 1102 as shown and configured to communicate with each other, such as via one or more system buses (not shown) or other suitable connection. In some embodiments, the computer system 1100 may be an information-handling system mentioned before. In the context of the embodiment in FIG. 1, the computer system 1100 may be an example of the SDN controller 110 shown in FIG. 1. In certain embodiments, one or more routing elements 114-117 also may have the architecture similar to that shown for the computing device 1100 in FIG. 11.

In one embodiment, the input devices 1108 may provide user inputs—such as user inputs received during setting up the training of an NN, such as the LSTM-RNN model 204 in FIGS. 7-9—to the processor 1102 and the software tool 102 for further processing as per teachings of the present disclosure. The input devices 1108 may include, for example, a touchpad, a camera, a computer keyboard, a touch-screen, a joystick, a physical or virtual "clickable button," a computer mouse/pointing device, and the like. A display screen is an example of the output device 1110. Other examples of an output device include a graphics/display device, a computer screen or monitor, an alarm system, or any other type of data output device. In some embodiments, the input device(s) 1108 and the output device(s) 1110 may be coupled to the processor 1102 via an I/O or peripheral interface(s). In some embodiments, the computer system 1100 may include more than one instance of the devices shown. In various embodiments, all of the components shown in FIG. 11 may be housed within a single housing. In other embodiments, the computer system 1100 may not include all of the components shown in FIG. 11. Furthermore, the computing device 1100 may be configured as a standalone system, as a server system, as a client system, or in any other suitable form factor.

The processor 1102 is a hardware device that may include a single processing unit or a number of processing units, all of which may include single or multiple computing units or multiple cores. When the computing device 1100 is a multiprocessor system, there may be more than one instance of the processor 1102 or there may be multiple processors coupled to the processor 1102 via their respective interfaces (not shown). The processor 1102 may include an integrated Graphics Processing Unit (GPU) or the GPU may be a separate processor device in the system 1100. The processor 1102 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 1102 may be configured to fetch and execute computer-readable instructions stored in the memory 1104, the peripheral storage 1112, or other computer-readable media. In some embodiments, the processor 1102 may be a System on Chip (SoC).

The memory 1104 and the peripheral storage unit 1112 are examples of non-transitory computer media (e.g., memory storage devices) for storing instructions that can be executed by the processor 1102 to perform the various functions described herein. For example, the memory unit 1104 may include both volatile memory and non-volatile memory (e.g., RAM, ROM, or the like) devices. Further, in particular embodiments, the peripheral storage unit 1112 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 1104 and mass storage devices constituting the peripheral storage 1112 may be collectively referred to as memory or computer storage media herein, and may be a media capable of storing computer-readable, processor-executable program instructions as computer program code that can be executed by the processor 1102 as a particular machine configured for carrying out the operations and functions described in the implementations herein.

The computing device 1100 may also include one or more communication interfaces as part of its interface unit 1106 for exchanging data via a network. The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet, the communication network represented by the data plane 108 in FIG. 1, and the like. Communication interfaces in the interface unit 1106 can also provide communication with external storage (not shown), such as in a storage array, network attached storage, storage area network, one or more databases, or the like.

The computer storage media, such as the memory 1104 and the mass storage devices in the peripheral storage 1112, may be used to store software and data. For example, the computer storage media may be used to store the operating system (OS) for the computing device 1100, various device drivers for the device 1100, various inputs provided by the user during the implementation of the software tool 102, and the data such as audio content, video content, text data, streaming content, router usage data, or any other type of content. The computer storage media also may store software applications such as a word processing application, a spreadsheet application, the software tool 102, and the like. The program code for the software applications and the OS may be executed by the processor 1102.

In one embodiment, a non-transitory, computer-readable data storage medium, such as, for example, the system memory 1104 or the peripheral data storage unit 1112 may store program code or software for the software tool 102 as per particular embodiments of the present disclosure. In the embodiment of FIG. 11, the system memory 1104 is shown to include such program code. In the embodiment of FIG. 11, the software tool application 102 may operate in conjunction with the host OS (not shown) of the computing device 1100. The processor 1102 may be configured to execute the program code for the software tool 102, whereby the computer system 1100 may be operative to perform various tasks associated with the software tool 102 as per the teachings of the present disclosure. In one embodiment, such tasks may include, for example, the process steps illustrated in FIG. 3 as well as other tasks discussed with reference to FIGS. 1-2 and 4-10 such as, for example, reception of historical router usage data, prediction of future router usage for each router in the network, recommendation of network paths, selection of routers to route the data packet according to the recommended network path, and so on. The program code or software for the suggestion tool 102 may be proprietary software or open source software which, upon execution by the processor 1102, may enable the computer system 1100 to perform operations to support router usage prediction and routing path selection as per teachings of the present disclosure.

In particular embodiments, the computing device 1100 may include an on-board power supply unit 1114 to provide electrical power to various system components illustrated in FIG. 11. The power supply unit 1114 may receive batteries or may be connectable to an AC electrical power outlet. In one embodiment, the power supply unit 1114 may convert solar energy or other renewable energy into electrical power.

The example systems and devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The terms "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions), such as the program code for the software tool 102, that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
selecting, by a computing device, a Long Short Term Memory Recurrent Neural Network (LSTM-RNN) model, wherein
the LSTM-RNN model includes a Deep Boltzmann Machine (DBM) model having a single visible layer and multiple hidden layers;
modeling, by the computing device, each individual routing element of a plurality of routing elements in a data plane of a Software-Defined Networking (SDN) architecture as a distinct unit in a corresponding one of the hidden layers of the DBM model;
obtaining a historical usage pattern of the individual routing elements of the plurality of routing elements;
training, by the computing device, the DBM model based on the historical usage pattern of individual routing elements of the plurality of routing elements, wherein the training is performed in a control plane of the Software-Defined Networking (SDN) architecture, wherein the data plane and the control plane of the SDN architecture are decoupled;
providing, by the computing device, a source Internet Protocol (IP) address and a destination IP address of a data packet to be routed through the data plane as units of the visible layer of the DBM model; and
using, by the computing device, the trained DBM model to evaluate predicted future usages of corresponding routing elements forming the hidden layers of the DBM model to recommend a routing path for the data packet within the data plane based on the source and the destination IP addresses.

2. The method of claim 1, wherein the DBM model is a stacked LSTM-RNN model.

3. The method of claim 1, further comprising:
predicting, by the computing device, network utilization of the data plane over a pre-defined time period based on a corresponding predicted future usage of each individual routing element of the plurality of routing elements in the data plane.

4. The method of claim 1, further comprising:
recommending, by the computing device, a routing path within the data plane that is based on a corresponding predicted future usage of each routing element of the plurality of routing elements within the routing path as determined by the DBM model.

5. The method of claim 1, further comprising:
recommending, by the computing device, a routing path within the data plane based on predicted future usages of all of the plurality of routing elements in the data plane.

6. The method of claim 1, wherein the computing device is an SDN controller.

7. A computing system comprising:
a memory storing program instructions; and
a processing unit coupled to the memory and operable to execute the program instructions, which, when executed by the processing unit, cause the computing system to:
select a Long Short Term Memory Recurrent Neural Network (LSTM-RNN) model, wherein
the LSTM-RNN model includes a Deep Boltzmann Machine (DBM) model having a single visible layer and multiple hidden layers;

model each individual routing element of a plurality of routing elements in a data plane of a Software-Defined Networking (SDN) architecture as a distinct unit in a corresponding one of the hidden layers of the DBM model;

obtain a historical usage pattern of the individual routing elements of the plurality of routing elements, wherein the data plane and a control plane of the SDN architecture are decoupled;

train the DBM model based on a historical usage pattern of the individual routing elements of the plurality of routing elements, wherein the training is performed in a control plane of the Software-Defined Networking (SDN) architecture;

provide a source Internet Protocol (IP) address and a destination IP address of a data packet to be routed through the data plane as units of the visible layer of the DBM model; and use the trained DBM model to evaluate predicted future usages of corresponding routing elements forming the hidden layers of the DBM model to recommend a routing path for the data packet within the data plane based on the source and the destination IP addresses.

8. The computing system of claim 7, wherein the DBM model is a stacked LSTM-RNN model.

9. The computing system of claim 7, wherein the program instructions, upon execution by the processing unit, cause the computing system to:

use the (DBM) DBM model to recommend a routing path for a data packet within the data plane that is based, at least in part, on a corresponding predicted future usage of each individual routing element of the plurality of routing elements within the routing path and based at least in part, on a source IP address and a destination IP address for the data packet.

10. The computing system of claim 7, wherein the program instructions, upon execution by the processing unit, cause the computing system to:

predict network utilization of the data plane over a pre-defined time period based on a corresponding predicted future usage of each individual routing element of the plurality of routing elements in the data plane.

11. The computing system of claim 7, wherein the computing system is an SDN controller.

12. A computer program product comprising a non-transitory computer-usable medium having computer-readable program code embodied therein, the computer-readable program code adapted to be executed by a computing system to implement a method comprising:

selecting a Long Short Term Memory Recurrent Neural Network (LSTM-RNN) model, wherein
the LSTM-RNN model includes a Deep Boltzmann Machine (DBM) model having a single visible layer and multiple hidden layers;

modeling each individual routing element of a plurality of routing elements in a data plane of a Software-Defined Networking (SDN) architecture as a distinct unit in a corresponding one of the hidden layers of the DBM model;

obtaining a historical usage pattern of the individual routing elements of the plurality of routing elements, wherein the data plane and a control plane of the SDN architecture are decoupled;

training the DBM model based on a historical usage pattern of individual routing elements of the plurality of routing elements, wherein the training is performed in a control plane of the Software-Defined Networking (SDN) architecture;

providing a source Internet Protocol (IP) address and a destination IP address of a data packet to be routed through the data plane as units of the visible layer of the DBM model; and using the trained DBM model to evaluate predicted future usages of corresponding routing elements forming the hidden layers of the DBM model to recommend a routing path for the data packet within the data plane based on the source and the destination IP addresses.

13. The computer program product of claim 12, wherein the method further comprises:

recommending a routing path within the data plane that is based on a corresponding predicted future usage of each individual routing element of the plurality of individual routing elements within the routing path as determined by the DBM model.

14. The computer program product of claim 13, wherein the recommending comprises:

using the DBM model to recommend the routing path of a data packet in the data plane based, at least in part, on the predicted future usage of individual routing elements of the plurality of routing elements and, at least in part, on a source IP address and destination IP address for the data packet.

15. The computer program product of claim 12, wherein the method further comprises:

recommending a routing path within the data plane based on predicted future usages of all individual routing elements of the plurality of routing elements in the data plane.

* * * * *